Patented Oct. 30, 1928.

1,689,748

UNITED STATES PATENT OFFICE.

ALFRED OPPÉ, OF AACHEN, GERMANY.

PROCESS OF MAKING ALKALI-METAL HYPOCHLORITES.

No Drawing. Application filed June 26, 1926, Serial No. 118,862, and in Germany April 17, 1926.

This invention relates to a process for the production of solid mixtures of alkali metal hypochlorite and alkali metal chloride by the action of chlorine on alkali metal hydroxide.

I have discovered that solid mixtures of alkali metal hypochlorite and alkali metal chloride may be obtained by suspending dry alkali metal hydroxide in a liquid which, in the cold, has no chemical action on the alkali metal compounds here present and on chlorine and which dissolves substantially no alkali metal chloride or alkali metal hypochlorite, and treating this suspension with chlorine. A suitable liquid is e. g. carbon tetrachloride.

For example chlorine gas may be passed through a cooled suspension of dry powdered alkali metal hydroxide in carbon tetrachloride, or a solution of chlorine in carbon tetrachloride may be added to such a suspension. The product of the reaction may be separated from the liquid and the water formed by the reaction by filtration and drying.

I claim:

1. Process for the manufacture of solid mixtures of alkali metal hypochlorite and alkali metal chloride which comprises reacting with chlorine on a suspension of dry alkali metal hydroxide in a neutral liquid in which neither alkali metal hypochlorite nor alkali metal chloride are materially soluble.

2. Process which comprises reacting with chlorine upon a suspension of alkali metal hydroxide in carbon tetrachloride and separating the resulting alkali metal hypochlorite and alkali metal chloride from the reaction mixture.

In testimony whereof I affix my signature

ALFRED OPPÉ.